July 11, 1961
J. P. SHUTRITS
2,991,580
WEEDLESS FISHING LURE
Filed March 17, 1959
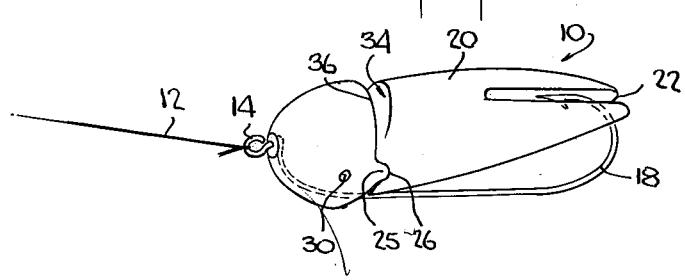
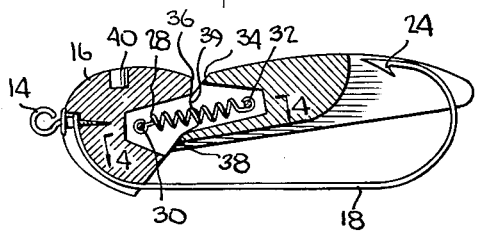
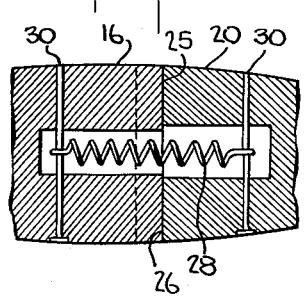
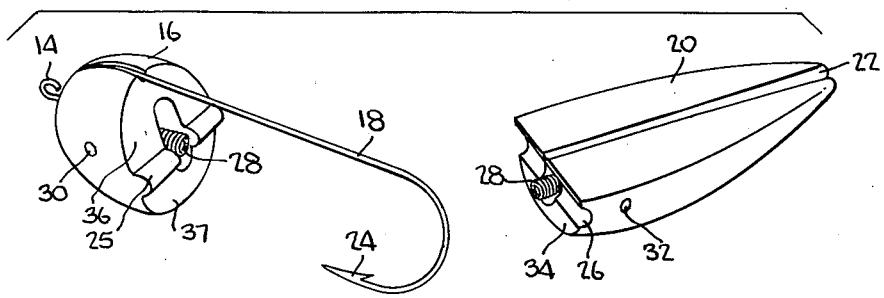
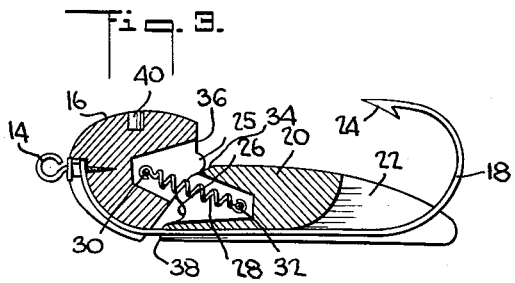
INVENTOR.
JOSEPH P. SHUTRITS
BY
Kenyon & Kenyon
ATTORNEYS ber, 1961

United States Patent Office 2,991,580
Patented July 11, 1961

2,991,580
WEEDLESS FISHING LURE
Joseph Peter Shutrits, Rte. 9G, East Park,
Hyde Park, N.Y.
Filed Mar. 17, 1959, Ser. No. 800,004
2 Claims. (Cl. 43—42.41)

This invention relates to artificial fishing lures and more particularly to an improved weedless fishing lure.

One of the most vexing problems for a fisherman who uses artificial plugs or fishing lures which are cast, is the difficulty in fishing in those areas where weeds, lily pads, marsh grass, logs, etc. have a tendency to become entangled with the hooks or barbs of the lure. Since it is in just such locations that fish are most often found, it is necessary to fish in such places. Many attempts have been made to overcome this deficiency by providing so-called "weedless" fishing lures, none of which have proved satisfactory.

One of the most common types of weedless fishing lures which has been used before relies on catch means included in the lure which is released when the fish strikes the lure and causes an extraordinary force on the line, which is attached to the catch means and hence releases the catch. The hook, under the force of gravity or a spring is exposed, making it possible to hook the fish. The difficulty with this type of weedless lure has been that in the normal casting operation it has been found that either the catch prematurely disengages and releases the hook before a fish strikes the lure, making the lure subject to becoming entangled in weeds and the like, or requires so much force that even when a fish strikes, the hook remains protected.

Another common type of weedless fishing lure is one which has a spring-restrained movable hook and a fixed body. The pressure of the jaws of the fish is relied on to expose the hook so that it can engage the mouth of the fish. This type of weedless lure is unsatisfactory since it does not expose the hook until the fish exerts considerable pressure on the lure by biting it to overcome the constant spring pressure. Since it does not operate when the fish first strikes it has been found unsatisfactory in use.

Other types of weedless lures have been employed, none of which are completely satisfactory. Some are too complex and their hook-exposing mechanisms are subject to becoming fouled, causing the hook to remain protected even when a fish bites or strikes the lure. Others are unsatisfactory in that the hook is carried by the body portion of the lure and the hooks become disengaged when a fish is caught.

Accordingly it is an object of this invention to provide improved weedless fishing lures.

A further object is to provide an improved fishing lure which has means to prevent the hook from being exposed under normal casting and fishing conditions but which exposes the hook as soon as the fish strikes or bites the lure.

Other objects and features of this invention will become more apparent from the description which follows when taken in connection with the drawings in which:

FIG. 1 is a perspective view of the improved lure of this invention;

FIG. 2 is a cross-sectional elevation view of the lure shown in FIG. 1 when the lure is in its closed condition;

FIG. 3 is a cross-sectional elevation view of the fishing lure of this invention in its opened condition;

FIG. 4 is a cross-sectional top view taken on the line 4—4 of FIG. 2; and

FIG. 5 is an exploded perspective view illustrating the components which make up the improved fishing lure of this invention.

Referring now to FIGS. 1 and 2, it will be seen that the lure 10 has the usual fishing line 12 attached to it by means of an eye screw 14. The eye screw 14 is attached to the front body portion 16 of the lure 10.

A hook 18 is carried by the eye screw 14 on the front body portion 16. The rear body portion 20 of the lure 10 has a slotted end portion 22 which, when the lure is in the closed condition shown in FIG. 2, completely covers the barb 24 of the hook 18 and so long as the lure 10 remains in the closed condition the barb 24 of the hook 18 remains protected. Thus the barb 24 cannot become entangled in weeds, lily pads, logs, or the like, as the lure 10 is dragged through the water while fishing when the lure is in the closed condition shown in FIG. 2.

As may be seen in FIGS. 2, 3, 4 and 5 the front body portion 16 has a ridged portion 25 and the rear body portion 20 has a matching grooved portion 26. When the rear body portion 20 is in its rearward position with respect to the front body portion 16, as shown in FIG. 2, the ridged portion 25 supports and carries the grooved portion 26. Thus in its rearward position the slotted rear end 22 of the rear body portion 20 fully protects the barb 24. When, for any reason, the grooved portion 26 is displaced from the ridged portion 25, the rear body portion is moved by connecting spring 28 into the forward or open condition shown in FIG. 3. As shown in FIG. 3, when the open condition is assumed, the barb 24 is fully exposed.

The spring 28 is connected on one end to a pin 30 which passes through the front body portion 16. The other end of the spring 28 is attached to a pin 32 passing through the rear body portion 20. Spring 28 is arranged to connect the body portions 16, 20 and urge the rear body portion 20 forward with a constant force.

When the lure 10 is in its closed condition with the hook 18 fully protected by the slotted portion 22, the forward end surface 34 and hence the groove 26 is forced by the spring 28 against the rear surfaces 36, 37 of the front body portion 16. It will be noted that the front end surface 38 of the rear body portion 20 in cooperation with the rounded portion 39 of the surface 34 act to maintain the rear portion 20 in firm contact with the rear surfaces 36, 37 of the front body portion 16. As may be seen in FIGS. 1 and 2 the forwardly inclined plane, which is the rear surface 37 of front body portion 16, matches the rearwardly inclined plane of the surface 34. The angle of the two inclined planes with respect to a longitudinal plane through the lure just mentioned is substantially the same. The two inclined plane surfaces cooperate to maintain the body portions 16, 20 in a stable condition during normal casting.

Since the spring force on the rear body portion 20 is constant, the rear body portion 20 remains in the closed condition until a fish, by striking the lure, moves the rear portion 20 an amount sufficient to displace the grooved portion 26 from the ridged portion 25. The rear body portion 20 may be rotated or twisted easily since the only connections are the spring 28 which freely rotates on pins 30, 32 and the matching ridged portion 25 and groove portion 26. Only a slight amount of rotation or twisting force will cause the grooved portion 26 to be displaced. When that occurs the spring 28 moves the rear body portion 20 forward to the position shown in FIG. 3, exposing the barb 24 of the hook 18.

The amount of the spring tension provided by spring 28 must not be too great or the rear body portion 20 would never be displaced from the front body portion 16 and hence the hook 18 would not be exposed. However, the spring force cannot be too small since it must be sufficient to maintain the rear body portion 20 in the closed position with respect to the front body portion 16 under normal handling and casting conditions. The necessary spring force, satisfactory for any particular lure, is determined by testing the lure, so that under normal casting conditions the lure remains closed.

From the above, it will be seen that the improved fishing lure of this invention is one which is truly weedless. In use, until a force acts on the rear body portion 20 which is greater than normally encountered during casting or reeling in, the lure 10 will remain in its closed condition. The difficulties with other types of lures which relied on catch means released by extraordinary forces on the line are overcome. Here, until a fish strikes the lure 10 the spring 28 maintains the rear body portion 20 in its rearward closed condition.

Only when the balance of the rear body portion 20 and front body portion 16 is upset by a fish will the hook 18 become exposed. Once the rear body portion 20 is displaced, the spring 28 causes a snap action and the barb 24 of the hook 18 is immediately and completely exposed.

One of the important features of this invention is the attachment of the hook 18 directly to the eye screw 14. This is important since the principal force which is supported by the hook 18 is concentrated at that point of the lure 10 where the line 12 is attached by means of the eye screw 14. In other types of lures the hooks are attached only to the body portion of the lure rather than as illustrated here. Often the hook was pulled out of the lure by the fish caught thereon and the lure became useless. The type of attachment as shown herein eliminates this problem.

For best results, the lure 10 will normally be used in a condition which is inverted from that shown in FIGS. 1, 2 and 3. If the body portions 16, 20 of the lure 10 are constructed from wood or are made from some other bouyant material a weight 40 (FIGS. 2 and 3) centered in the head portion 16, will insure that the rear end of the rear body portion 20 will be down when the lure 10 is being played or reeled in.

A buoyant line is preferable for top-water fishing and hence in most instances the lure 10 should be weighted or so constructed so that the rear body portion 20 remains down in use. If under-water fishing is desired it does not matter whether the position of the lure 10 is as shown in FIGS. 1, 2 and 3 or inverted as just described.

While the lure of this invention has been shown embodied in a particular shape, it will be appreciated that any standard lure could be modified in accordance with the teaching of this invention to make it completely snag-proof or weedless. It will be appreciated by those skilled in the art that modifications can be made which do not depart from the spirit of this invention nor the scope of the appended claims.

What is claimed is:

1. A weedless fishing lure comprising a front body portion, a rear body portion having a slotted rear end, hook means rigidly attached to and carried by said front body portion extending rearwardly into the slotted rear end of said rear body portion, the rear end surface of said front body portion having an upper portion lying in a plane substantially perpendicular to the horizontal, a ridge portion and a lower portion lying in a forwardly inclined plane when the lure is in a normal position, the forward end of said rear body portion having an upper portion lying in a plane rearwardly inclined and substantially at the same angle of said forwardly inclined plane, and a grooved portion intermediate the bottom and top of said forward end of said rear body portion and adapted to receive said ridge, said rear body portion being capable of assuming a rearward position when said ridge is located in said groove and a forward position when said ridge is displaced from said groove relative to said front body portion, and spring means for moving said rear body portion from said rearward to said forward position when said grooved end portion of said rear body portion is displaced from said ridged end portion of said front body portion, said hook remaining protected in said slotted rear end when said rear body portion is in the rearward position and exposed when said rear body portion is in said forward position.

2. A weedless fishing lure comprising a front body portion having line-connecting means attached to the forward portion thereof, a rear body portion having a slotted rear end, hook means having a barbed portion rigidly attached to and carried by said front body portion extending rearwardly into the slotted rear end of said rear body portion, the rear end surface of said front body portion having an upper portion lying in a plane substantially perpendicular to the horizontal, a ridge portion and a lower portion lying in a forwardly inclined plane when the lure is in a normal position, the forward end of said rear body portion having an upper portion lying in a plane rearwardly inclined and substantially at the same angle of said forwardly inclined plane, and a grooved portion intermediate the bottom and top of said forward end of said rear body portion adapted to receive said ridge, said rear body portion being capable of a rearward position when said ridge is located in said groove and a forward position when said ridge is displaced from said groove, relative to said front body portion, and spring means for moving said rear body portion from said rearward to said forward position when said grooved end portion of said rear body portion is displaced from said ridged end portion of said front body portion, said barbed portion of said hook means remaining protected in said slotted rear end when said rear body portion is in the rearward position and exposed when said rear body portion is in said forward position.

References Cited in the file of this patent

UNITED STATES PATENTS

| | | |
|---|---|---|
| 1,144,756 | Damsma | June 29, 1915 |
| 1,644,884 | Johnson | Oct. 11, 1927 |
| 2,518,238 | Keeler | Aug. 8, 1950 |
| 2,568,547 | Hoffman | Sept. 18, 1951 |
| 2,576,532 | Nudell | Nov. 27, 1951 |
| 2,748,520 | Anderson | June 5, 1956 |